United States Patent
Xie

(10) Patent No.: US 12,510,171 B2
(45) Date of Patent: Dec. 30, 2025

(54) FAUCET WITH NOVEL VALVE CORE STRUCTURE

(71) Applicant: Jiangmen Haizhou Trading Co., Ltd., Kaiping (CN)

(72) Inventor: Aiping Xie, Putian (CN)

(*) Notice: Subject to any disclaimer, the term of this patent is extended or adjusted under 35 U.S.C. 154(b) by 66 days.

(21) Appl. No.: 18/625,959

(22) Filed: Apr. 3, 2024

(65) Prior Publication Data

US 2025/0314315 A1    Oct. 9, 2025

(51) Int. Cl.
  *F16K 11/074* (2006.01)
  *E03C 1/02* (2006.01)
  *E03C 1/04* (2006.01)

(52) U.S. Cl.
  CPC ........ *F16K 11/0746* (2013.01); *E03C 1/0404* (2013.01); *E03C 2001/026* (2013.01)

(58) Field of Classification Search
  CPC ............. E03C 1/0404; E03C 2001/026; F16K 11/0746
  USPC .............................. 4/677, 567, 675, 676, 678
  See application file for complete search history.

(56) References Cited

U.S. PATENT DOCUMENTS

| | | | |
|---|---|---|---|
| 11,761,180 B2* | 9/2023 | Li | E03C 1/0412 |
| | | | 4/676 |
| 11,781,297 B1* | 10/2023 | Rice | E03C 1/04 |
| | | | 4/675 |
| 11,788,261 B2* | 10/2023 | Schmitt | E03C 1/0401 |
| | | | 4/678 |
| 2023/0295906 A1* | 9/2023 | Kutsch | E03C 1/025 |
| | | | 4/678 |
| 2025/0075810 A1* | 3/2025 | Tuzin | F16K 11/0853 |

FOREIGN PATENT DOCUMENTS

| | | | | |
|---|---|---|---|---|
| AU | 2022441342 A1 * | 5/2024 | .......... | E03C 1/0404 |
| CN | 103511725 A * | 1/2014 | .......... | F16K 49/002 |
| CN | 207161750 U | 3/2018 | | |
| CN | 108730563 A * | 11/2018 | .......... | E03C 1/0404 |
| CN | 218221424 U | 1/2023 | | |
| CN | 219035604 U | 5/2023 | | |
| CN | 117432838 A * | 1/2024 | .......... | E03C 1/0405 |
| CN | 117881915 A * | 4/2024 | .......... | F16K 11/0743 |
| WO | WO-2024255675 A1 * | 12/2024 | .......... | F16K 27/045 |

* cited by examiner

*Primary Examiner* — Lori L Baker
(74) *Attorney, Agent, or Firm* — Nitin Kaushik

(57) ABSTRACT

A faucet includes a main housing with communicating first and second chambers. A valve core is mounted in the first chamber and controls water flow from an inlet pipe to an outlet pipe mounted in the second chamber. The outlet pipe includes a bendable braided pipe. An inlet connector, sleeved with a rubber ring, is plugged into an outlet opening of the valve core. An outlet connector is plugged at the other end, with both connectors fixed by a steel sleeve. A mesh liner is detachably connected to the outlet connector. The structure permits direct mounting of the valve core on a zinc alloy faucet.

9 Claims, 8 Drawing Sheets

FAUCET WITH NOVEL VALVE CORE STRUCTURE

TECHNICAL FIELD

The invention relates to the the technical field of valve core mounting, and more particularly to a faucet with a novel valve core structure.

BACKGROUND

In the prior art, a faucet is composed of parts such as a main body, a valve core and an outlet pipe. However, the conventional valve core cannot be directly applied to a washbasin faucet made of zinc alloy, and requires a copper core or a plastic core seat for auxiliary installation.

Therefore, it is an technical problem urgently needed to be solved to provide a faucet with a novel valve core structure so that the valve core is directly mounted on the washbasin faucet made of zinc alloy.

SUMMARY

The technical problem to be solved by the invention is how to provide a faucet with a novel valve core structure, so that the valve core is directly mounted on a washbasin faucet made of zinc alloy.

To this end, according to a first aspect, embodiments of the invention disclose a faucet with a novel valve core structure, including a main housing, a valve core, an outlet pipe and a handle, wherein a first chamber and a second chamber communicating with each other are provided in the main housing; a press cover is internally threaded to the main housing, and the press cover is configured for connecting and limiting the valve core; the handle is connected to the valve core which is mounted in the first chamber; the outlet pipe is mounted in the second chamber; the valve core is configured for controlling the communication state between the inlet pipe and the outlet pipe; wherein the valve core has an inlet opening and an outlet opening; the inlet opening is configured for mounting an inlet pipe; the outlet pipe includes a bendable braided pipe; an inlet connector is plugged at one end of the braided pipe, and the inlet connector is sleeved with a rubber ring and is mounted at the outlet opening; an outlet connector is plugged at the other end of the braided pipe; the inlet connector and the outlet connector are both fixedly connected via a steel sleeve; and the outlet connector is detachably connected with a mesh liner.

According to a further arrangement of the invention, the outlet opening is a tapered hole and the rubber ring is a tapered ring.

According to a further arrangement of the invention, the main housing is overlapped with a decorative cover located between the press cover and the handle.

According to a further arrangement of the invention, the decorative cover is sleeved with a first sealing ring.

According to a further arrangement of the invention, the main housing is internally threaded with an adapter.

According to a further arrangement of the invention, a second sealing ring is mounted to the bottom of the main housing.

According to a further arrangement of the invention, the number of the inlet openings is set to two, wherein one of the inlet openings is configured for communicating with a hot water pipe and the other of the inlet openings is configured for communicating with a cold water pipe.

According to a further arrangement of the invention, the valve core includes a valve upper housing and a valve base which are snap-fitted with each other; the valve upper housing abuts against the press cover; the inlet opening and the outlet opening are both provided on the valve base; a first valve plate is snap-fitted on the valve base; a second valve plate is provided on the first valve plate; a third valve plate is snap-fitted on the second valve plate; a valve cover is overlapped on the third valve plate; the valve cover is provided with a hinged valve handle (27) in a passing through way; the handle is fixedly connected to one end of the valve handle; and the third valve plate abuts against the other end of the valve handle.

According to a further arrangement of the invention, one end of the valve handle is inserted into the handle; and the handle is internally threaded with a fastening screw which abuts against the valve handle.

The invention has the following advantageous effects. According to the valve core having an inlet opening and an outlet opening, the inlet opening is configured for mounting an inlet pipe. A rubber ring is sleeved on an inlet connector and is mounted at the outlet opening, and the other end of the braided pipe is plugged with the outlet connector, so as to provide a faucet with a novel valve core structure. The valve core is in direct communication with the outlet pipe without auxiliary installation of a copper core or a plastic core seat, so that the valve core is directly mounted on a washbasin faucet made of a zinc alloy material. The installation is simple and the manufacturing cost is low.

BRIEF DESCRIPTION OF DRAWINGS

In order to more clearly describe the technical solutions in the detailed description of the invention or the prior art, the drawings to be used in the description of the embodiments or the prior art will be briefly introduced below. It will be apparent to those skilled in the art that the drawings in the following description are some implementations of the invention, and that other drawings may be obtained from the drawings without any creative works.

Figure 1:
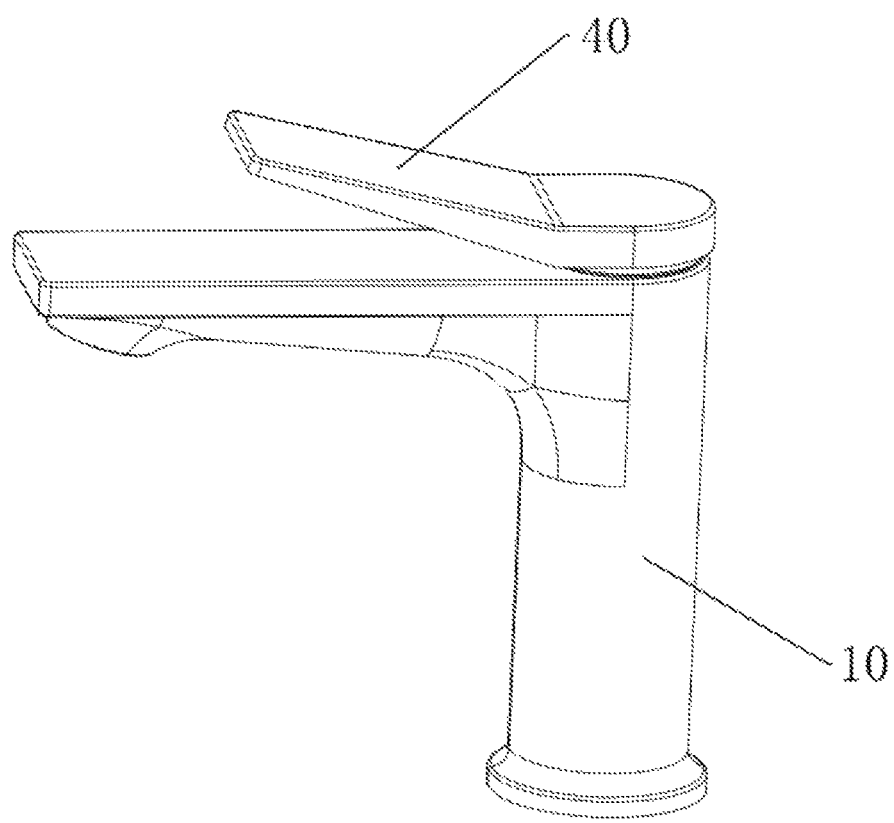
FIG. 1 is a schematic perspective view of a faucet with a novel valve core structure according to the present embodiment.
Figure 2:
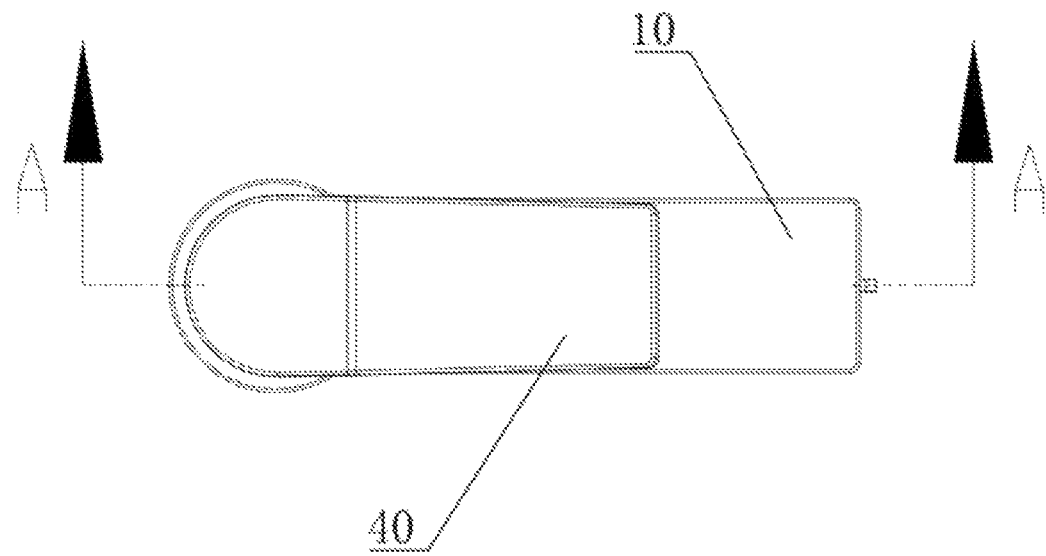
FIG. 2 is a schematic top view of a faucet with a novel valve core structure according to the present embodiment.

Reference numerals: 10, main housing; 11, first chamber; 12, second chamber; 20, valve core; 21, valve upper housing; 22, valve base; 221, inlet opening; 222, outlet opening; 23, first valve plate; 231, first through hole; 232, second through hole; 24, second valve plate; 221, third concave hole; 25, third valve plate; 26, valve cover; 27, valve handle;

30, outlet pipe; 31, braided pipe; 32, inlet connector; 33, rubber ring; 34, outlet connector; 35, steel sleeve; 36, mesh liner; 40, handle; 50, press cover; 71, decorative cover; 72, first sealing ring; 81, adapter; 82, second sealing ring; 91, fastening screw; 92, plug.

DETAILED DESCRIPTION OF THE EMBODIMENTS

In order that the objects, aspects, and advantages of the invention will become more apparent, a more particular description of the invention will be rendered by reference to the appended drawings and embodiments. It should be understood that the specific examples described herein are merely used for explanation of the invention and are not intended to be limiting thereof.

In the description of the invention, it should be understood that the terms "mounted", "connected", or "connecting" are to be broadly construed as being, for example, fixed connection, removable connection, or integrate connection, unless specifically stated and defined otherwise. They may be mechanical connection or electrical connection. Also, they may be direct or indirect connection through an intermediary, may be communication internal to two elements and may be wireless connection or wired connection. The specific meaning of the above terms in this invention will be understood in specific circumstances by those of ordinary skill in the art.

In the description of the invention, it should be understood that the directional or positional relationships indicated by the terms "center", "up", "down", "left", "right", "vertical", "horizontal", "inner", "outer" and the like are based on the directional or positional relationships shown in the drawings. It is merely for the purpose of describing the invention and simplifying the description, and is not intended to indicate or imply that a particular orientation, configuration and operation of the referenced device or element is required and should not be construed as limiting the scope of the invention. Furthermore, the terms "first", "second", "third", and the like are used solely for descriptive purposes and are not to be construed as indicating or implying relative importance.

Furthermore, the technical features involved in the various implementations of the invention described below may be combined with each other as long as they do not conflict with each other.

Disclosed in an embodiment of the invention is a faucet with a novel valve core structure, as shown in FIGS. 1-8, including: a main housing 10, a valve core 20, an outlet pipe 30 and a handle 40, wherein a first chamber 11 and a second chamber 12 communicating with each other are provided in the main housing 10; a press cover 50 is internally threaded to the main housing 10, and the press cover 50 is configured for connecting and limiting the valve core 20; the handle 40 is connected to the valve core 20 which is mounted in the first chamber 11; the outlet pipe 30 is mounted in the second chamber 12; the valve core 20 is configured for controlling the communication state between the inlet pipe and the outlet pipe 30;

wherein the valve core 20 has an inlet opening 221 and an outlet opening 222; the inlet opening 221 is configured for mounting an inlet pipe; the outlet pipe 30 includes a bendable braided pipe 31; an inlet connector 32 is plugged at one end of the braided pipe 31, and the inlet connector 32 is sleeved with a rubber ring 33 and is mounted at the outlet opening 222; an outlet connector 34 is plugged at the other end of the braided pipe 31; the inlet connector 32 and the outlet connector 34 are both fixedly connected via a steel sleeve 35; and the outlet connector 34 is detachably connected with a mesh liner 36.

It needs to be stated that, according to the valve core 20 having an inlet opening 221 and an outlet opening 222, the inlet opening 221 is configured for mounting an inlet pipe. A rubber ring 33 is sleeved on an inlet connector 32 and is mounted at the outlet opening 222, and the other end of the braided pipe 31 is plugged with the outlet connector 34, so as to provide a faucet with a novel valve core structure. The valve core 20 is in direct communication with the outlet pipe 30 without auxiliary installation of a copper core or a plastic core seat, so that the valve core 20 is directly mounted on a washbasin faucet made of a zinc alloy material. The installation is simple and the manufacturing cost is low.

Figure 3:
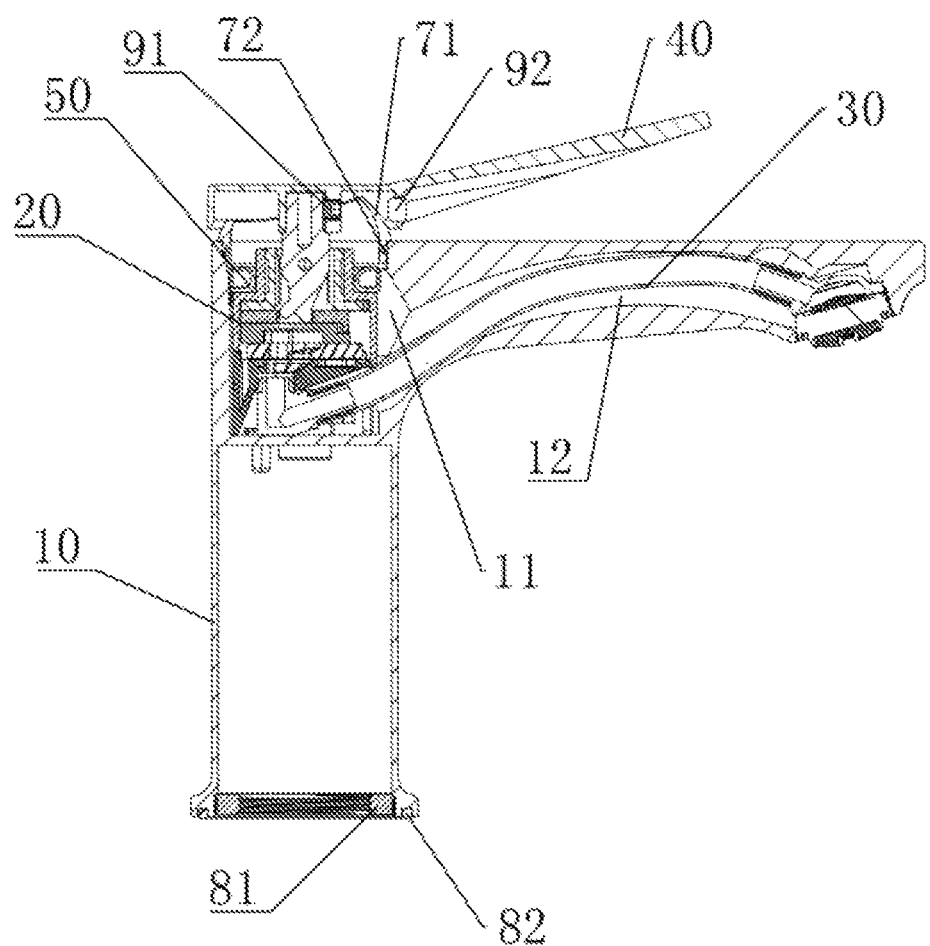
FIG. 3 is a sectional view taken along line A-A of FIG. 2.
Figure 4:
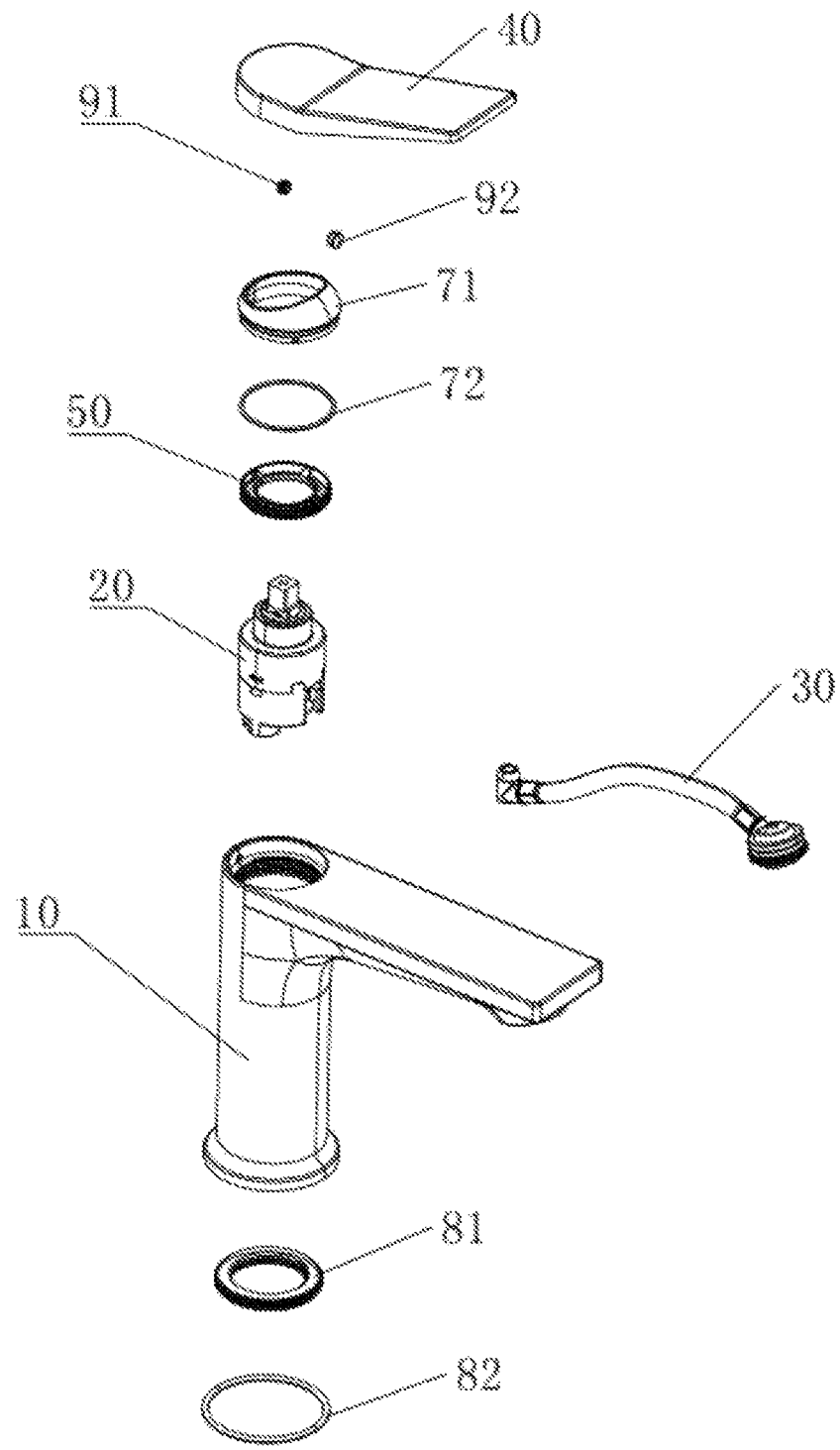
FIG. 4 is an explosive structure view of a faucet with a novel valve core structure according to the present embodiment.
Figure 5:
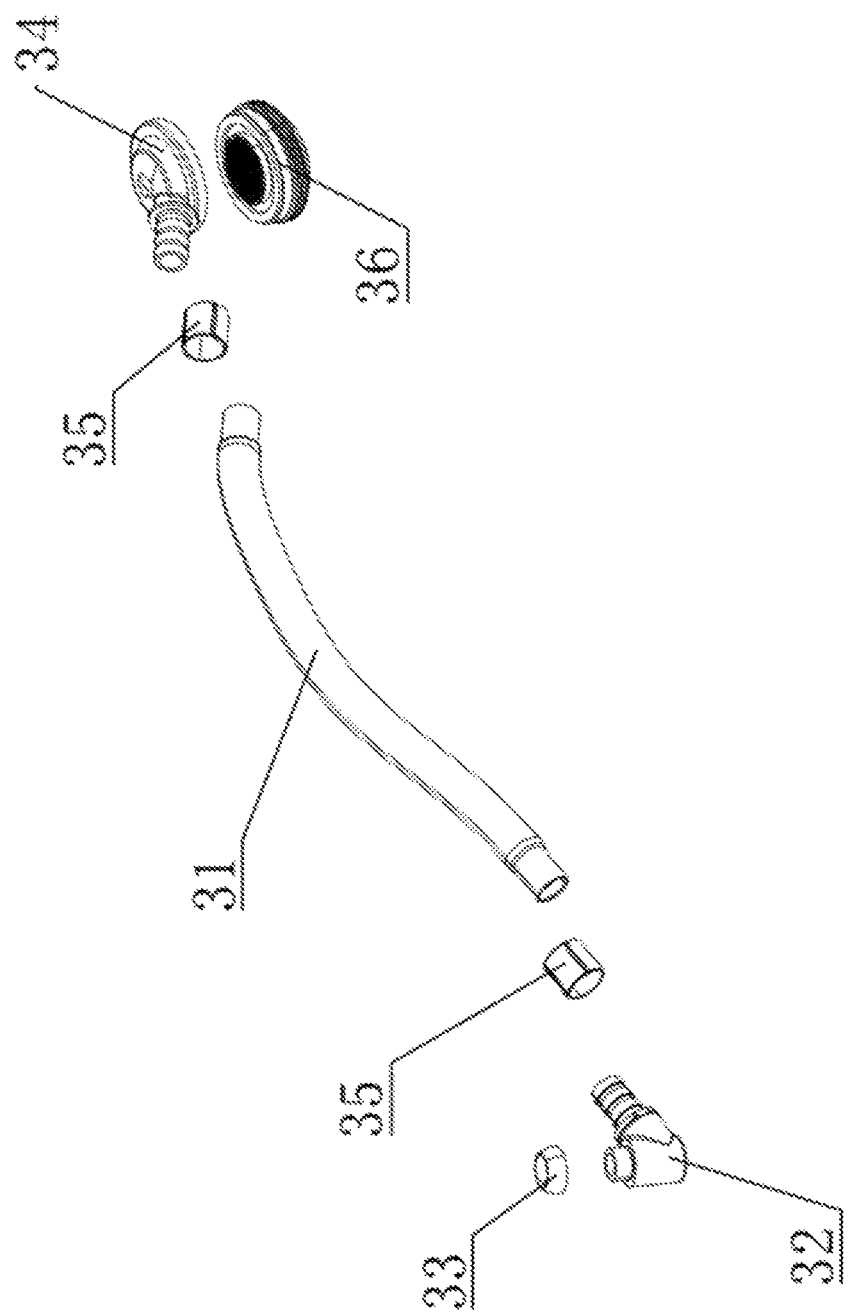
FIG. 5 is a structure view of an outlet pipe in a faucet with a novel valve core structure according to the present embodiment.

As shown in FIGS. 3-5, the outlet opening 222 is a tapered hole and the rubber ring 33 is a tapered ring. Note that since the outlet opening 222 is a tapered hole and the rubber ring 33 is a tapered ring, it facilitates the installation of the outlet pipe 30 and it is easy to assemble. The water outlet direction can be guided.

As shown in FIGS. 3-8, the main housing 10 is overlapped with a decorative cover 71 located between the press cover 50 and the handle 40.

As shown in FIGS. 3 and 4, the decorative cover 71 is sleeved with a first sealing ring 72. Note that the first sealing ring 72 has an O-shaped configuration. The first sealing ring 72 has a sealing function to seal the decorative cover 71.

As shown in FIGS. 3 and 4, the main housing 10 is internally threaded with an adapter 81. It should be noted that the provision of the adapter 81 facilitates the threaded connection and the fixing of a pipe and the installation of the faucet.

As shown in FIGS. 3 and 4, a second sealing ring 82 is mounted at the bottom of the main housing 10. Note that the second sealing ring 82 has an O-shaped configuration. The second sealing ring 82 has a sealing function to seal the bottom of the main housing 10.

Figure 6:
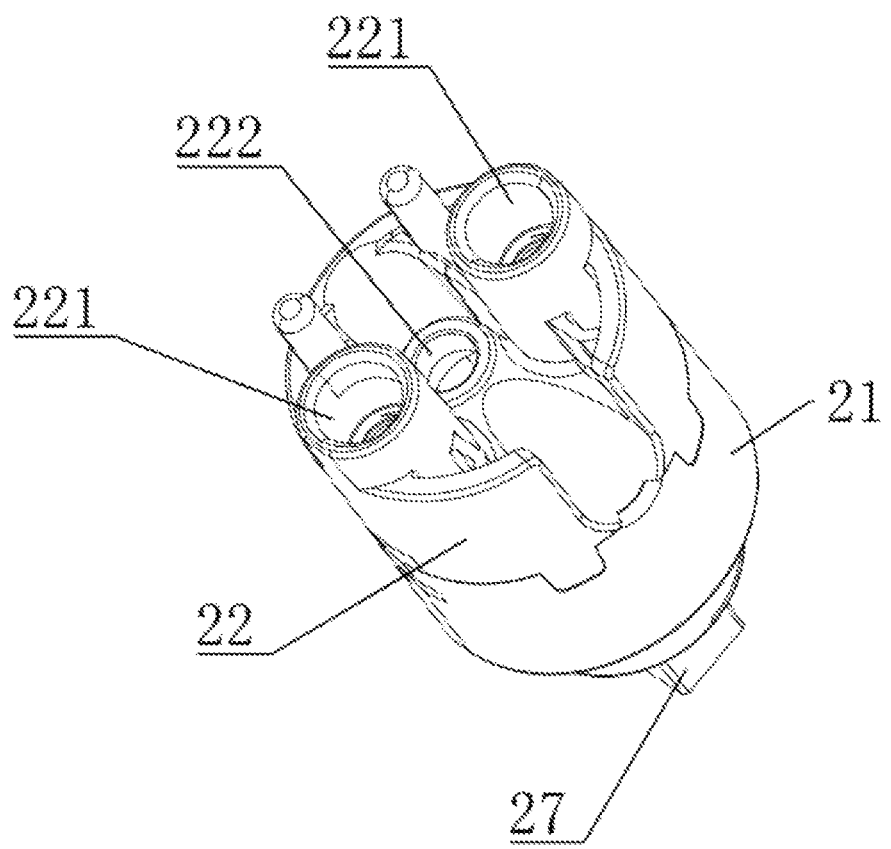
FIG. 6 is a structure view of a valve core in a faucet with a novel valve core structure according to the present embodiment.
Figure 7:
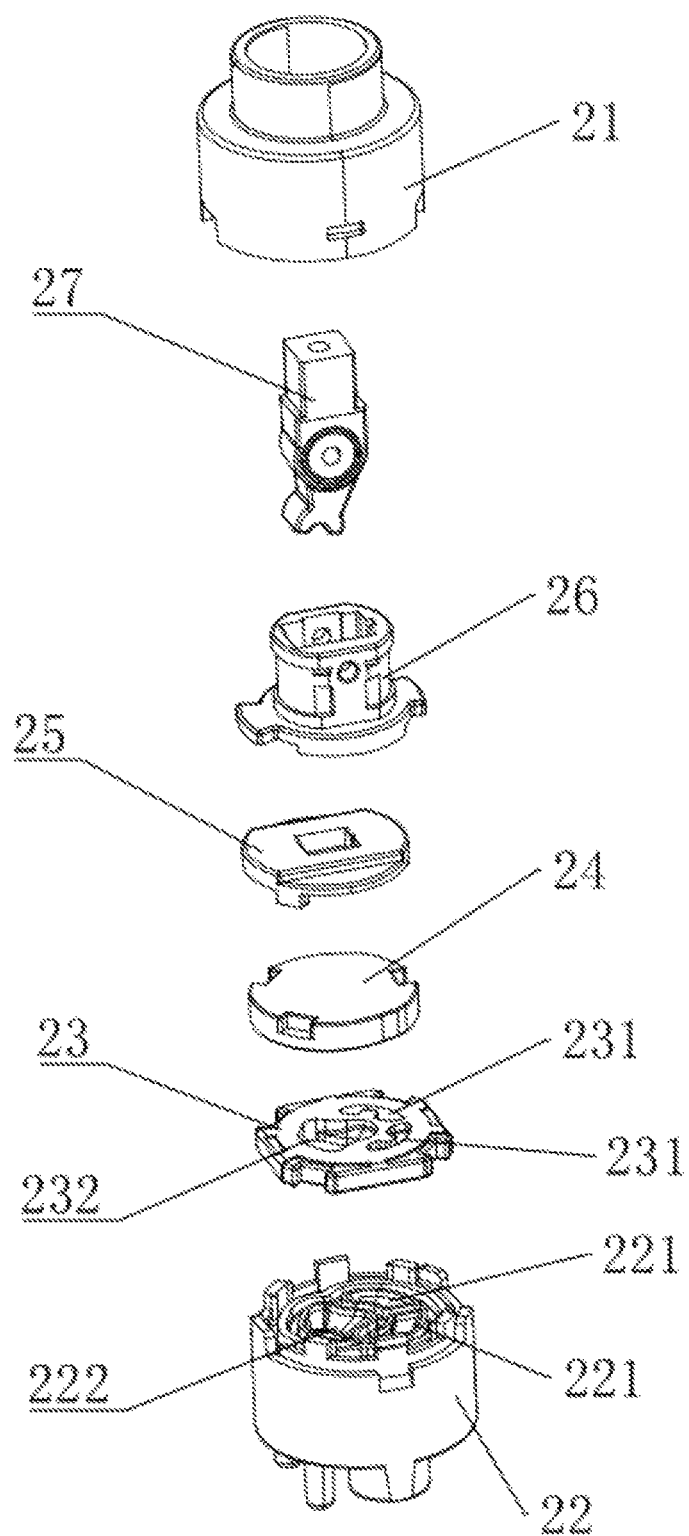
FIG. 7 is an explosive structure view I of a valve core in a faucet with a novel valve core structure according to the present embodiment.
Figure 8:
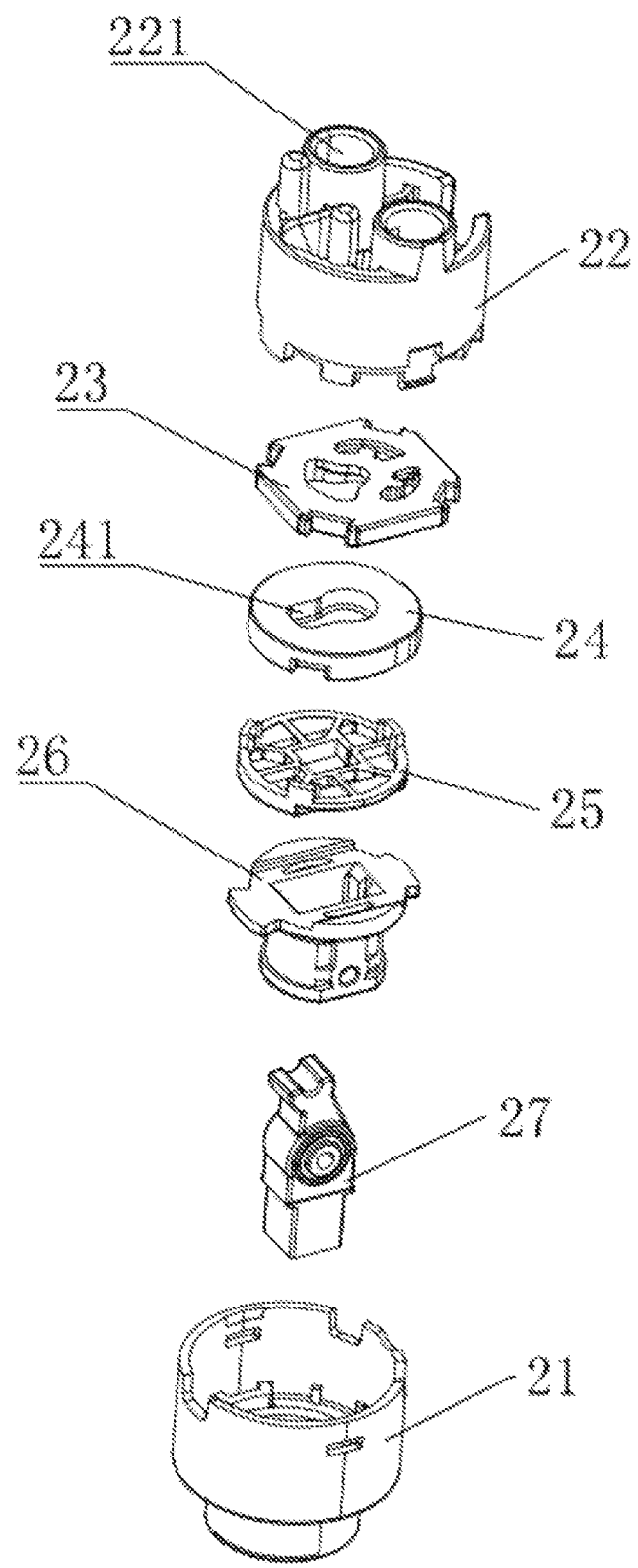
FIG. 8 is an explosive structure view II of a valve core in a faucet with a novel valve core structure according to the present embodiment.

As shown in FIGS. 6 to 8, the number of the inlet openings 221 is set to two. One of the inlet openings 221 is configured for communicating with a hot water pipe and the other inlet opening 221 is configured for communicating with a cold water pipe. Note that the faucet may discharge hot or cold water by the arrangement of the two inlet openings 221.

As shown in FIGS. 3-8, the valve core 20 includes a valve upper housing 21 and a valve base 22 which are snap-fitted with each other. The valve upper housing 21 abuts against the press cover 50. The inlet opening 221 and the outlet opening 222 are both provided on the valve base 22. A first valve plate 23 is snap-fitted on the valve base 22. A second valve plate 24 is provided on the first valve plate 23. A third valve plate 25 is snap-fitted on the second valve plate 24; a valve cover 26 is overlapped on the third valve plate 25; the valve cover 26 is provided with a hinged valve handle 27 in a passing through way; the handle 40 is fixedly connected to one end of the valve handle 27; and the third valve plate 25 abuts against the other end of the valve handle 27. In the specific implementation, a first through hole 231 and a second through hole 232 are provided on the first valve plate 23. The first through hole 231 corresponds to the inlet opening 221. The second through hole 232 corresponds to the outlet opening 222. A third concave hole 221 is provided on the second valve plate 24. The third concave hole 221 corresponds to the second through hole 232. Initially, the first through hole 231 is not in communication with the second through hole 232. When the handle 40 of the faucet is rotated and pulled, the first through hole 231, the second through hole 232, the third through hole and the outlet opening 222 are communicated to form a water outlet passage.

It should be noted that initially, the valve core 20 has a sealing function, and the inlet opening 221 and the outlet opening 222 fail to communicate. When an operator rotates and pulls the handle 40, the valve handle 27 drives the third valve plate 25 to move. Under the action of water pressure, the second valve plate 24 is lifted up, so that the inlet opening 221 and the outlet opening 222 communicate with each other, and water flows out from the outlet pipe 30, thus achieving the water outlet function of the faucet.

As shown in FIGS. 1 to 8, one end of the valve handle 27 is inserted into the handle 40, and a fastening screw 91 is internally threaded into the handle 40. The fastening screw 91 abuts against the valve handle 27. In practice, the handle 40 is provided with a through hole, and a plug 92 is mounted on the through hole. It should be noted that the fastening screw 91 may be easily removed and assembled by the operator by providing the through hole.

Assembly method. The outlet connector 34 of the outlet pipe 30 is mounted in the main housing 10. The mesh liner 36 is mounted on the outlet connector 34. The inlet connector 32 with the rubber ring 33 is inserted into the outlet opening 222 of the valve core 20, and the fastening screw 91 is tightened so that the fastening screw 91 abuts against the valve handle 27, thereby mounting the valve core 20 and the outlet pipe 30 into the main housing 10.

Working principle. According to the valve core 20 having an inlet opening 221 and an outlet opening 222, the inlet opening 221 is configured for mounting an inlet pipe. A rubber ring 33 is sleeved on an inlet connector 32 and is mounted at the outlet opening 222, and the other end of the braided pipe 31 is plugged with the outlet connector 34, so as to provide a faucet with a novel valve core structure. The valve core 20 is in direct communication with the outlet pipe 30 without auxiliary installation of a copper core or a plastic core seat, so that the valve core 20 is directly mounted on a washbasin faucet made of a zinc alloy material. The installation is simple and the manufacturing cost is low.

Obviously, the above-described embodiments are merely illustrative for clarity of the examples given and are not restrictive of the implementations. It will be apparent to those skilled in the art that various other modifications and variations can be made in the invention without departing from the scope or spirit of the invention. All implementations need not be, and cannot be, exhaustive. The obvious changes or alterations resulting therefrom are still within the scope of protection of the invention.

What is claimed is:

1. A faucet with a valve core structure, comprising a main housing (10), a valve core (20), an outlet pipe (30) and a handle (40), wherein a first chamber (11) and a second chamber (12) communicating with each other are provided in the main housing (10);
   a press cover (50) is internally threaded to the main housing (10), and the press cover (50) is configured for connecting and limiting the valve core (20); the handle (40) is connected to the valve core (20) which is mounted in the first chamber (11); the outlet pipe (30) is mounted in the second chamber (12); the valve core (20) is configured for controlling the communication state between the inlet pipe and the outlet pipe (30);
   wherein the valve core (20) has an inlet opening (221) and an outlet opening (222); the inlet opening (221) is configured for mounting an inlet pipe; the outlet pipe (30) comprises a bendable braided pipe (31); an inlet connector (32) is plugged at one end of the braided pipe (31), and the inlet connector (32) is sleeved with a rubber ring (33) and is mounted at the outlet opening (222); an outlet connector (34) is plugged at the other end of the braided pipe (31); the inlet connector (32) and the outlet connector (34) are both fixedly connected via a steel sleeve (35); and the outlet connector (34) is detachably connected with a mesh liner (36).

2. The faucet with the valve core structure according to claim 1, wherein the outlet opening (222) is a tapered hole and the rubber ring (33) is a tapered ring.

3. The faucet with the valve core structure according to claim 1, wherein the main housing (10) is overlapped with a decorative cover (71) located between the press cover (50) and the handle (40).

4. The faucet with the valve core structure according to claim 3, wherein the decorative cover (71) is sleeved with a first sealing ring (72).

5. The faucet with the valve core structure according to claim 1, wherein the main housing (10) is internally threaded with an adapter (81).

6. The faucet with the valve core structure according to claim 1, wherein a second sealing ring (82) is mounted to the bottom of the main housing (10).

7. The faucet with the valve core structure according to claim 1, wherein the number of the inlet openings (221) is set to two, wherein one of the inlet openings (221) is configured for communicating with a hot water pipe and the other of the inlet openings (221) is configured for communicating with a cold water pipe.

8. The faucet with the valve core structure according to claim 1, wherein the valve core (20) comprises a valve upper housing (21) and a valve base (22) which are snap-fitted with each other; the valve upper housing (21) abuts against the press cover (50); the inlet opening (221) and the outlet opening (222) are both provided on the valve base (22); a first valve plate (23) is snap-fitted on the valve base (22); a second valve plate (24) is provided on the first valve plate (23); a third valve plate (25) is snap-fitted on the second valve plate (24); a valve cover (26) is overlapped on the third valve plate (25); the valve cover (26) is provided with a hinged valve handle (27) in a passing through way; the handle (40) is fixedly connected to one end of the valve handle (27); and the third valve plate (25) abuts against the other end of the valve handle (27).

9. The faucet with the valve core structure according to claim 8, wherein one end of the valve handle (27) is inserted into the handle (40); and the handle (40) is internally threaded with a fastening screw (91) which abuts against the valve handle (27).

* * * * *